Patented Jan. 4, 1938

2,104,409

UNITED STATES PATENT OFFICE 2,104,409

LUBRICANT

Peter J. Wiezevich, Elizabeth, N. J., assignor to Standard Oil Development Company, a corporation of Delaware No Drawing. Application October 3, 1933, Serial No. 692,034

1 Claim. (Cl. 87—9)

This invention covers the preparation of superior lubricants and involves particularly the use of oxygen-free polymers of acetylene and its derivatives for improving the properties of lubricating oils. The term "oxygen-free" herein employed is used to differentiate between polymers such as polyvinylacetylene and chlorprene, which are relatively free from oxygen, from materials such as polyvinyl esters, ethers and the like, which contain in some cases as much as 30% oxygen or more. It is possible that very small amounts of oxygen may be present in substances of the polychlorprene or polyvinylacetylene type, and such compounds are within the scope of this invention.

A number of methods for producing oxygen-free polymers of acetylene or its derivatives are known. The most noteworthy are those involving the intermediate production of divinyl acetylene or chlorprene, followed by the polymerization of these compounds to thick liquids and rubber-like or semi-solid, materials of varying molecular weights. The term "chlorprene" will be understood to mean the chlorbutadiene described as chlorprene in J. A. C. S. 53, 4203 (1931). The linear polymers, i. e., those polymerizing in relatively long chains similar to the type attributed to be present in unvulcanized rubber, are the most suitable for this purpose. Although in some cases the polymers may be employed as such for improving lubricating oils, they are generally unstable or have low solubilities in oils, necessitating further treatment such as hydrogenation, halogenation, limited depolymerization, alkylation and the like, before they are employed in the preparation of lubricants according to this invention.

When acetylene is passed into a mixture of ammonium chloride and copper powder of suitable proportions and under proper conditions, a liquid product is obtained from which a good yield of divinyl acetylene ($C_6H_6$) is recovered by distillation. This compound is a liquid boiling at about 80–85° C. Upon polymerization, a product resembling a drying oil may be obtained which can be blended with lubricants to improve the properties of the latter, but due to the unstable nature of these polymers, which polymerize readily to insoluble compounds when contacted with air, it is preferred to subject the intermediate polymer to stabilization, such as by hydrogenation, addition of hydrogen halides or sulfur, or similar materials which act as inhibitors for further polymerization, condensation with other organic compounds, and the like.

The preferred method is to reflux the divinyl acetylene (or any other similar intermediate polymer) in the presence of air, butylamine, or other catalysts together with solvents such as xylene, and the like, for a prolonged period, for example 2–5 hours or even longer at 80–90° C. Boron fluoride at low temperatures (−50 to 10° C.) has been found to be an excellent catalyst for this purpose. At the end of that period the product may be directly hydrogenated, or it may be first subjected to distillation to remove the unpolymerized divinylacetylene, followed by hydrogenation of the higher molecular weight polymer under mild conditions in the presence of an active catalyst. For instance, hydrogenation under pressure at room temperature in the presence of finely divided palladium, or at 30 or 40° C. to 60 or even 90° C. at 20 to 200 atmospheres pressure of hydrogen in presence of a copper chromite or an activated nickel catalyst such as that obtained by leaching out a finely granulated nickel-aluminum alloy with caustic soda. Solvents may be added to facilitate agitation, and it is even possible to dissolve divinylacetylene in the lubricating oil, and to subsequently polymerize the intermediate polymer and stabilize the product so formed. Destructive hydrogenation may be even employed to advantage, especially in the case of the higher polymers. In such cases, temperatures as high as 90 to 200° C. may be used. The preferred catalysts under these conditions are the oxides or sulfides of the metals of the VI group of the Periodic Table, although nickel and other activated metals are also satisfactory. Other methods of polymerization and stabilization may also be used. Although a more or less complete reduction of the polymer may be obtained, it is necessary only to saturate a portion of the valences. The bonds which cause the greatest instability are satisfactorily saturated first.

The polymers so obtained are viscous products which, when dissolved in oils, alter the viscosity characteristics of the latter to a great extent. For instance, 5% will raise the viscosity of a Coastal lubricating oil from an S. A. E. 10 grade to an S. A. E. 20 or even 30, or higher, depending upon the molecular weight of the polymer used. The higher the average molecular weight, the greater will be the viscosity increase. Although molecular weights in the neighborhood of 1100 or lower are satisfactory, especially when used in larger amounts (10–40%) for the preparation of products such as gear oils, it is preferable to employ higher average molecular weights, as for example, 2000, 4000, 8000, or even higher, for blending with lubricating oils. In larger amounts, say 10-20% or even higher, grease-like products are obtained. Smaller amounts of 1% or even 0.2% have been found to be beneficial in certain oils. The lubricants which may be thickened in this manner are not only mineral oils, such as Pennsylvania or Mid-Continent stocks, but also synthetic oils such as those obtained by the polymerization of cracked wax, or by condensation of chlorinated wax with aromatics. Also, other materials suited as lubricants such as esters, as for example the phthalates, glycerides, butyl oleate, polymerized diphenyl oxide, and the like may be blended with these polymerized products.

Another method of obtaining a product, having thickening properties, is to polymerize vinyl chlorprene which is prepared by reacting vinyl acetylene with hydrogen chloride. By subjecting the chlorprene to the action of heat in the presence of air or other materials previously mentioned in connection with the preparation of polyvinylacetylene, a chlorinated polymer is obtained. This material may be added directly to lubricants, but the preferred method is to condense the polymer with an aromatic compound such as naphthalene, benzene, etc. in the presence of catalysts such as boron fluoride, aluminum chloride, acetic acid solution of sulfuric acid, and the like at temperatures low enough to prevent excessive polymerization in preference to condensation. Other methods of condensation, such as the Wurtz, or the method of alkylation with alkyl halides disclosed by L. A. Mikeska and S. C. Fulton in a copending application Serial No. 674,519, filed on June 6, 1933, or the reaction with sodium polysulfide as disclosed in the copending application of L. B. Turner, Serial No. 652,926, filed on January 21, 1933, may be employed.

Hydrogenation of polychlorprene, especially under destructive conditions may also be carried out according to the method previously described, to provide better solubility and stability. These processes are varied to suit the particular polymer treated.

The polychlorprenes or modified polychlorprenes prepared by the above process are excellent blending agents for lubricants, and are especially useful as thickening agents for mineral oils, ester lubricants, aromatic lubricants such as chlorinated diphenyl, and the like. The polymers may be subjected to mechanical breakdown as by milling, or forcing a solution under pressure through a fine orifice, and the like, or to heat depolymerization before addition to the lubricant. Furthermore, the halogen containing polymers may be subjected to the action of alkalies at elevated temperatures to remove a portion or substantially all of said halogen.

Besides divinyl acetylene and chlorprene, there are other oxygen free derivatives of acetylene, or of other acetylenic hydrocarbons, which may be suitable for the preparation of such blending agents. For instance, diacetylene or its lower polymers may be used. Diacetylene is produced in reasonable amounts during the cracking of hydrocarbons in the preparation of acetylene, by the electric arc treatment. Aryl or alkyl derivatives of acetylene, such as propine, butine, phenylacetylene, and the like are examples of such compounds.

Various other materials may be added to the blends of the above polymers, among which might be mentioned polymerization inhibitors such as sulfur or sulfur compounds, hydrogenated rubber, polymerized isobutylene or similar poly-olefins, oxidation inhibitors such as naphthols, thionaphthols, and the like, oiliness improves as for example fatty acids, load carrying agents of the class of lead or sulfur compounds, carbon preventers, sludge dispersing agents, and the like.

These polymers may also be used as blending agents in fuel oil, gasoline and other fuels, greases, and similar materials.

As many apparently widely different embodiments of this invention may be made without departing from the spirit and scope thereof, and it is understood that I do not limit myself to the specific embodiments thereof, except as defined in the appended claim in which it is my intention to cover the process as broadly as the prior art permits.

I claim:

A lubricant comprising a mineral oil and 0.2 to 10% of alkylated polychlorprene.

PETER J. WIEZEVICH.